United States Patent
Tsai et al.

(10) Patent No.: US 9,075,175 B2
(45) Date of Patent: Jul. 7, 2015

(54) LIGHT SOURCE MODULE

(71) Applicants: Han-Wen Tsai, Hsin-Chu (TW);
Ming-Feng Kuo, Hsin-Chu (TW)

(72) Inventors: Han-Wen Tsai, Hsin-Chu (TW);
Ming-Feng Kuo, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 188 days.

(21) Appl. No.: 13/756,542

(22) Filed: Feb. 1, 2013

(65) Prior Publication Data

US 2013/0201721 A1    Aug. 8, 2013

(30) Foreign Application Priority Data

Feb. 3, 2012 (TW) .............................. 101103615 A

(51) Int. Cl.
*F21V 7/04* (2006.01)
*F21V 8/00* (2006.01)

(52) U.S. Cl.
CPC ............ *G02B 6/0036* (2013.01); *G02B 6/0018* (2013.01); *G02B 6/002* (2013.01); *G02B 6/0028* (2013.01); *G02B 6/0031* (2013.01)

(58) Field of Classification Search
CPC .......................... G02B 6/0036; G02B 6/0038
USPC ......... 362/600, 615, 616, 623, 625, 626, 628, 362/608
See application file for complete search history.

(56) References Cited

U.S. PATENT DOCUMENTS 5,757,557 A    5/1998 Medvedev et al.
5,808,708 A    9/1998 Oyama et al.
7,239,792 B2    7/2007 Kim
2004/0170373 A1*    9/2004 Kim ............................... 385/147
2006/0022935 A1    2/2006 Sakai et al.
2006/0082884 A1*    4/2006 Feng et al. ..................... 359/569

(Continued)

FOREIGN PATENT DOCUMENTS

CN    1512240    7/2004
CN    1739283    2/2006

(Continued)

OTHER PUBLICATIONS

"Office Action of Taiwan Counterpart Application", issued on Aug. 20, 2014, p. 1-p. 7.

(Continued)

*Primary Examiner* — Anh Mai
*Assistant Examiner* — Zachary J Snyder
(74) *Attorney, Agent, or Firm* — Jianq Chyun IP Office

(57) ABSTRACT

A light source module including a light guide plate, a light-collecting structure and a light emitting device is provided. The light guide plate has a first light emitting surface, a bottom surface, a first light incident surface connecting with the bottom surface and the first light emitting surface, and an optical microstructure unit. The optical microstructure unit includes at least two optical microstructures. Each optical microstructure has a recessing part and a protruding part on the bottom surface. The light-collecting structure has a second light emitting surface connecting with the first light incident surface, a second light incident surface and a reflecting surface connecting with the second light emitting surface and the second light incident surface. A sectional line obtained by sectioning the reflecting surface along a first reference plane includes a first parabola. The reference plane is parallel to the first light emitting surface.

17 Claims, 13 Drawing Sheets

100A

(56) References Cited

U.S. PATENT DOCUMENTS

| | | | |
|---|---|---|---|
| 2006/0256578 A1* | 11/2006 | Yang et al. | 362/609 |
| 2007/0076435 A1* | 4/2007 | Chang | 362/626 |
| 2008/0278460 A1* | 11/2008 | Arnett et al. | 345/175 |
| 2009/0207344 A1* | 8/2009 | Ono et al. | 349/65 |

FOREIGN PATENT DOCUMENTS

| | | |
|---|---|---|
| CN | 1918428 | 2/2007 |
| CN | 101082737 | 12/2007 |
| CN | 101346581 | 1/2009 |
| CN | 101392889 | 3/2009 |
| CN | 101889225 | 11/2010 |
| CN | 102262262 | 11/2011 |
| JP | 2002-22964 | 1/2002 |
| JP | 2002-109930 | 4/2002 |
| JP | 2002-289023 | 10/2002 |
| JP | 2004-70169 | 3/2004 |
| JP | 2006-114503 | 4/2006 |
| JP | 2007-80596 | 3/2007 |
| JP | 4040027 | 1/2008 |
| JP | 2009-54454 | 3/2009 |
| JP | 2009-199927 | 9/2009 |
| JP | 2009-224316 | 10/2009 |
| JP | 2010-527100 | 8/2010 |
| TW | 538288 | 6/2003 |
| TW | 200639518 | 11/2006 |
| TW | M311911 | 5/2007 |
| TW | I284235 | 7/2007 |
| TW | 200933556 | 8/2009 |
| TW | 201030376 | 8/2010 |

OTHER PUBLICATIONS

"Office Action of China Counterpart Application", issued on Jul. 2, 2014, p. 1-p. 10.

"Office Action of Japan Counterpart Application", issued on Dec. 3, 2013, p. 1-p. 3.

* cited by examiner

LIGHT SOURCE MODULE

CROSS-REFERENCE TO RELATED APPLICATION

This application claims the priority benefit of Taiwan application serial no. 101103615, filed on Feb. 3, 2012. The entirety of the above-mentioned patent application is hereby incorporated by reference herein and made a part of this specification.

TECHNICAL FIELD

The invention relates to an optical device, more particularly to a light source module.

BACKGROUND

The distribution of the light emitting angles of light beams from a conventional light guide plate is broad. In a convention light guide module, the light guide plate is collocated and is used in conjunction with an optical film for guiding the light beams to a normal viewing direction. Currently, the most commonly known light source module is configured with a light guide plate having dots, a light emitting device disposed at a side of the light guide plate, a diffuser and two prism films disposed on the light guide plate, and a reflection sheet disposed under the light guide plate. However, the light emitting angle of light beams from a light source module with such a configuration is distributed at a broader range, regardless it is in the horizontal direction or the vertical direction. Hence, the brightness of this type of light source module is lower at the normal viewing direction.

In Taiwan patent application publication No. 201030376, an optical signal, after passing through a reflective device, a collimator and a guiding device to form a collimated optical signal, is disclosed. In Taiwan patent application publication No. 200933556, a display apparatus including a display device, a turning film, a second light guide device, a turning mirror and a light source is disclosed. In U.S. Pat. No. 7,239,792, a light, emitted from a backlight module, guided to and emitted out from a light emitting surface of a main light guide plate after passing through a sub light guide plate and a second optical fiber, is disclosed. In Taiwan patent application publication No. 200639518, an illumination system including a plurality of optical collimation regions and light mixing regions is disclosed. In U.S. Pat. No. 5,757,557, a secondary lens including a front-facing cavity and an internal cavity is disclosed. In the Taiwan patent No. 1284235, a light guide plate having a light incident surface facing the light source, and the light guide plate having a protruded ball-shape surface facing the light source is disclosed. In Taiwan patent No. M311911, a light guide plate having a V-shaped ridge at the bottom surface and the light emitting surface is disclosed.

SUMMARY

An exemplary embodiment of the invention provides a light source module, which has high collimation and favorable brightness in the normal direction.

Other advantages of the invention can be further illustrated by the technical features broadly embodied and described as follows.

An exemplary embodiment of the invention provides a light source module. The light module includes a light guide plate, at least a light-collecting structure, and at least a light emitting device. The light guide plate includes a first light emitting surface, a bottom surface opposite to the first light emitting surface, a first light incident surface connecting with the bottom surface and the first light emitting surface, and at least one optical microstructure unit. The optical microstructure unit includes at least two first optical microstructures. Each first optical microstructure includes a recess portion on the bottom surface and a protrusion portion on the bottom surface, wherein the recess portion and the protrusion portion are connected. The light-collecting structure includes a second light emitting surface connected with the first light incident surface, a second light incident surface, a first reflective surface connected with the second light emitting surface and the second light incident surface, a second reflective surface opposite to the first reflective surface and connecting with the second light emitting surface and the second light incident surface. A section of the second reflective surface obtained by a first reference plane includes a sectional line, and the sectional line includes a first parabola. The first reference plane is parallel to the first light emitting surface. At least one light emitting device is adapted to emitting light beams. The light beams pass sequentially the second light incident surface, the first reflective surface, the second light emitting surface, the first light incident surface to enter into the light guide plate. The light beams, entering the light guide plate, are guide by the optical microstructure unit to the first light emitting surface.

According to the light guide module of an exemplary embodiment of the invention, the recess portion includes a first micro-surface and a second micro-surface connecting with the first micro-surface, and the protrusion portion includes a third micro-surface and a fourth micro-surface connecting with the third micro-surface, wherein the second micro-surface and the third micro-surface are connected.

According to the light guide module of an exemplary embodiment of the invention, wherein the extension direction of the first micro-surface and the fourth micro-surface is substantially vertical to the first light emitting surface, while the extension direction of the second micro-surface and the third micro-surface is tilted with respect to the of the first light incident surface.

According to the light guide module of an exemplary embodiment of the invention, the second micro-surface and the third micro-surface are directly connected and are substantially coplanar.

According to the light guide module of an exemplary embodiment of the invention, wherein a portion of the light beams is reflected by one of the first optical microstructures of the optical microstructure unit to the first light emitting surface.

According to the light guide module of an exemplary embodiment of the invention, wherein a portion of the light beams is refracted by one of the first optical microstructures of the optical microstructure unit to another one of the first optical microstructures of the optical microstructure unit is reflected by the another one of the first optical microstructures to the first light emitting surface.

According to the light guide module of an exemplary embodiment of the invention, wherein the light guide plate further includes a plurality of optical microstructure units, and the density of these optical microstructure units at the bottom surface increases as the distance of the optical microstructure units from the first light incident surface increases.

According to the light guide module of an exemplary embodiment of the invention further including a plurality of optical microstructure units, wherein the light guide plate is also connected with the first light emitting surface and a bottom surface, and the first light emitting surface is directly connected with a first side surface and a second side surface opposite to the first side surface and connecting with the first side surface, wherein the density of these optical microstructure units at the bottom surface increases from the center of the light guide plate to the first side and to the second side.

According to the light guide module of an exemplary embodiment of the invention, the sectional of the first reflective surface obtained by the second reference plane includes a sectional line and the sectional line includes a curve substantially curved towards the light emitting device, wherein the second reference plane is vertical to the first light emitting surface.

According to the light guide module of an exemplary embodiment of the invention, wherein the sectional of the second reflective surface obtained by the first reference plane includes a sectional line including a second parabola.

According to the light guide module of an exemplary embodiment of the invention, the shortest distances from any two points on the first parabola to any point on the second parabola are substantially the same.

According to the light guide module of an exemplary embodiment of the invention, the light emitting device is substantially disposed on the focal plane of the first parabola.

According to the light guide module of an exemplary embodiment of the invention, the light-collecting structure further includes a first extension surface and a second extension surface opposite to the first extension surface, the first extension surface connects with the first reflective surface and the second light incident surface, and the second extension surface connects with the second reflective surface and the second light incident surface.

According to the light guide module of an exemplary embodiment of the invention, the first extension surface and the second extension surface are substantially parallel to the bottom surface.

According to the light guide module of an exemplary embodiment of the invention, the first extension surface and the second extension surface covers the entire bottom surface.

The light guide module of an exemplary embodiment of the invention further includes at least second optical microstructure, configured on the transmission path of the light beams and between the second light incident surface and the light emitting device.

According to the light guide module of an exemplary embodiment of the invention, wherein the second optical microstructure includes an arc surface, a first slanted surface and a second slanted surface respectively configured at two opposite sides of the arc surface and connected with the arc surface, and the first slanted surface and the second slanted surface are inclined with respect to the second light incident surface, and the inclined direction of the first slanted surface is opposite to the inclined direction of the second slanted surface.

According to the light guide module of an exemplary embodiment of the invention, wherein the second optical microstructure further includes a first connection surface and a second connection surface respectively configured at two opposite sides of the arc surface and extending towards the light emitting device, and the first connection surface connects with the first slanted surface and the arc surface, while the second connection surface connects with the second slanted surface and the arc surface.

The light guide module of an exemplary embodiment of the invention further includes a reflection sheet, configured between the bottom surface of the light guide plate and the light-collecting structure.

According to the light guide module of exemplary embodiments of the invention, the light source module, via the optical microstructure unit and the light-collecting structure, is adapted to provide the brightness distribution in the vertical direction or in the horizontal direction to focus towards the normal viewing direction.

Other objectives, features and advantages of the invention will be further understood from the further technological features disclosed by the embodiments of the invention wherein there are shown and described embodiments of this invention, simply by way of illustration of modes best suited to carry out the invention.

DETAILED DESCRIPTION OF DISCLOSED EMBODIMENTS

Reference will now be made in detail to the present exemplary embodiments of the invention, examples of which are illustrated in the accompanying drawings. In reference to the disclosure herein, for purposes of convenience and clarity only, directional terms, such as top, bottom, left, right, up, down, over, above, below, beneath, rear, and front are used with respect to the accompanying drawings. Such directional terms should not be constructed to limit the scope of the invention in any manner.

Exemplary Embodiment 1

Figure 1:
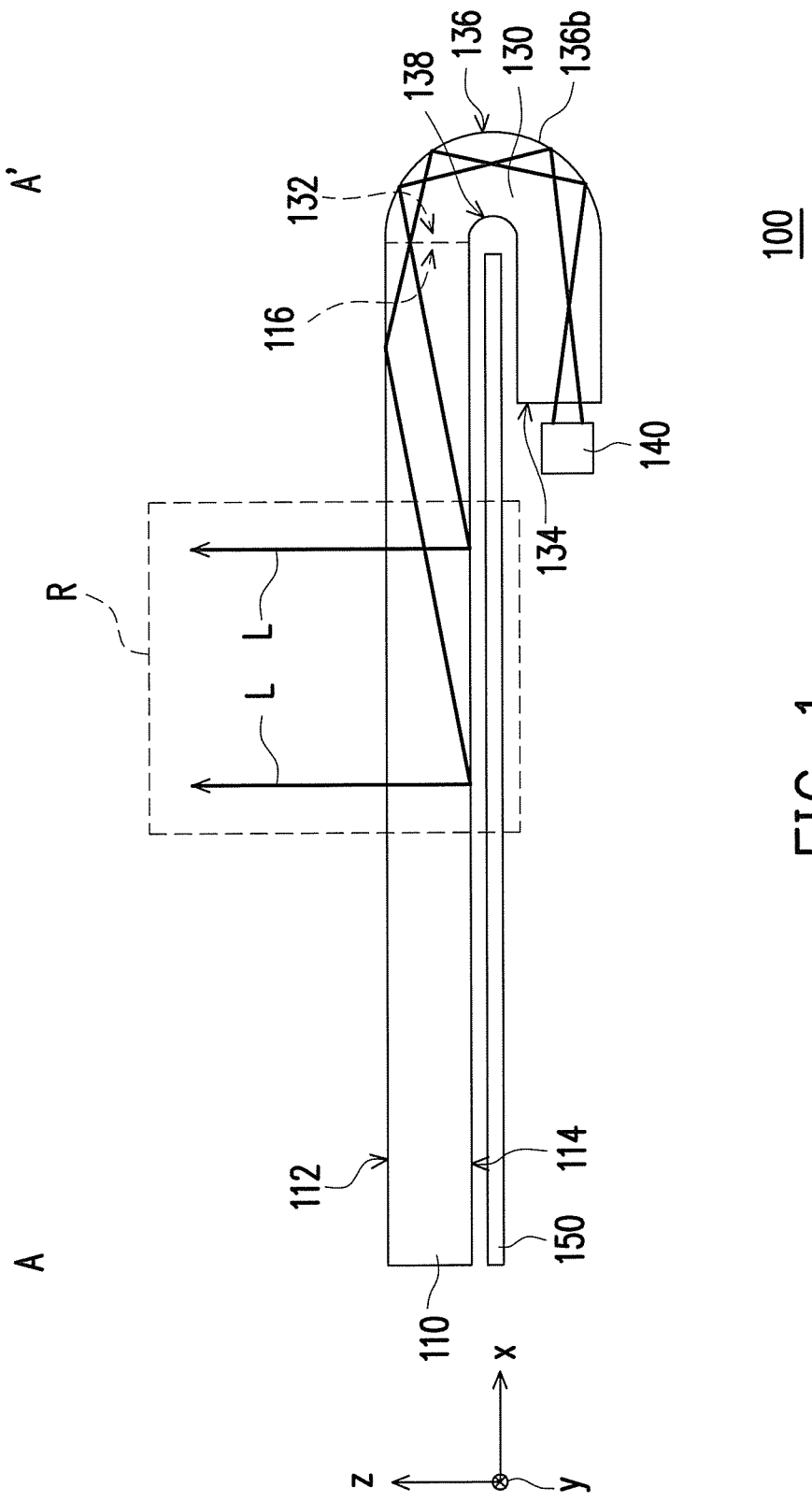
FIG. 1 is a schematic cross sectional view of a light source module according to a first exemplary embodiment of the invention.
Figure 2:
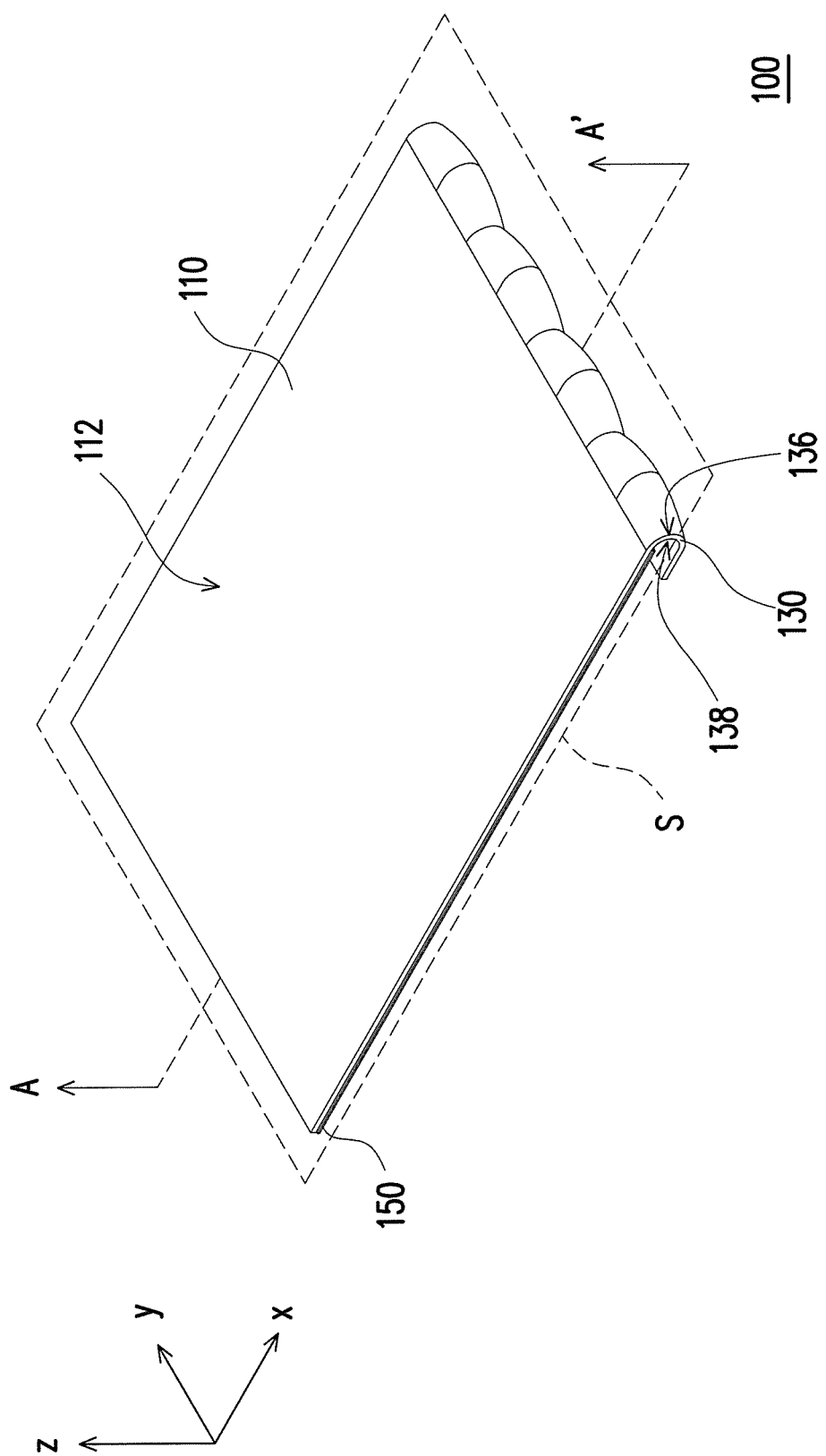
FIG. 2 is an isometric view of the light source module in FIG. 1.
Figure 3:
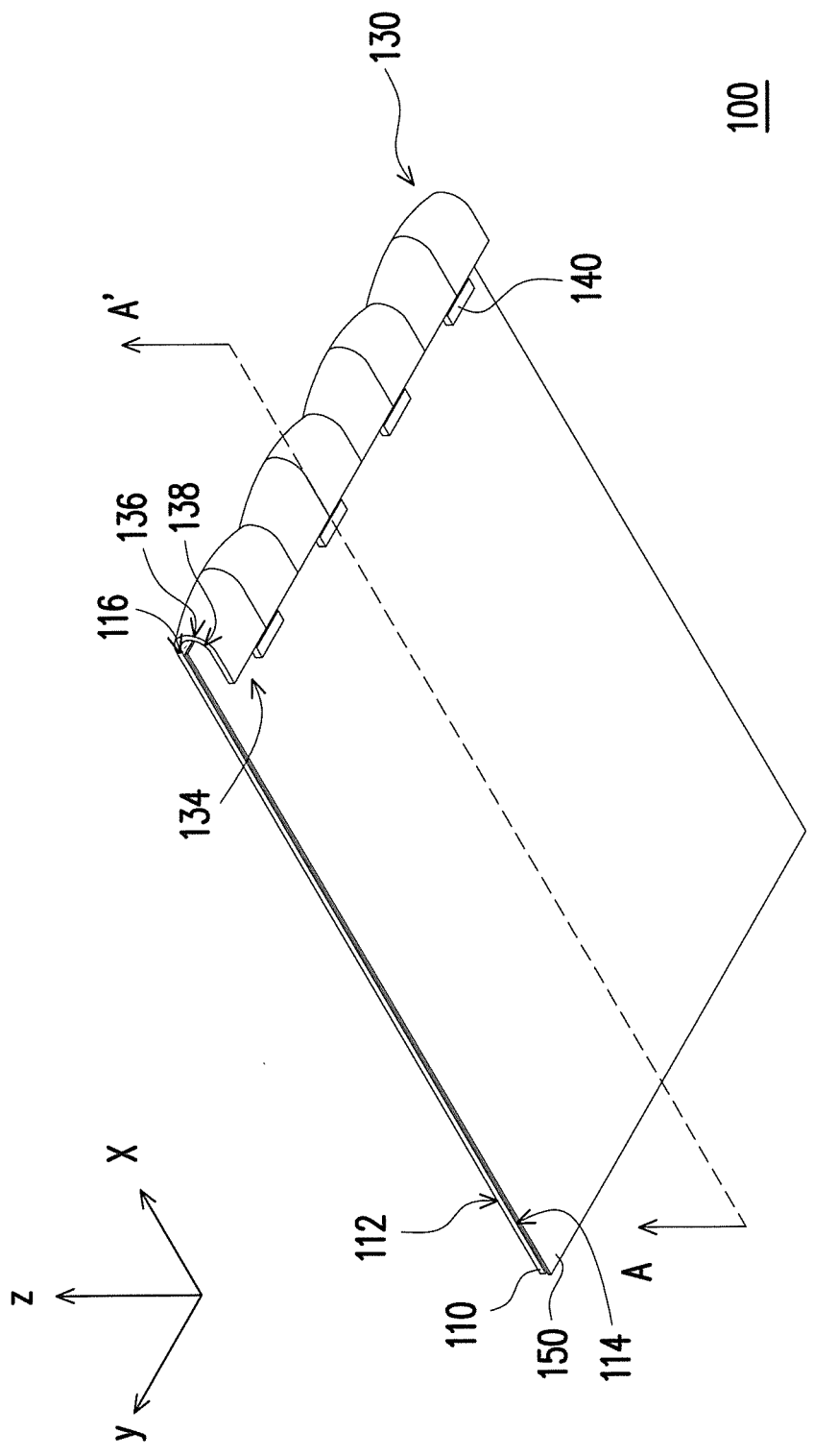
FIG. 3 is an isometric view of the light source module in FIG. 1.

FIG. 1 is a schematic cross sectional view of a light source module according to a first exemplary embodiment of the invention. FIG. 2 is an isometric view of the light source module in FIG. 1. FIG. 3 is an isometric view of the light source module in FIG. 1. In more detail, FIG. 1 is a schematic cross sectional view of FIGS. 2 and 3 along the sectional line AA'. Referring to FIGS. 1, 2 and 3, the light source module 100 of this exemplary embodiment includes a light guide plate 110, at least a light-collecting structure 130 and at least a light emitting device 140. The light source module illustrated in FIGS. 2 and 3 are exemplified with four light-collecting structures 130 and four light emitting devices 140. The light source module could have one light-collecting structure 130 corresponds to one light emitting device 140. It should be understood that the number of light-collecting structure 130 and the number of light emitting device 140 are presented by way of example and not by way of limitation. The number of light-collecting structure 130 and the number of light emitting device 140 depend on the actual design requirement.

The light guide plate 110 of this exemplary embodiment includes a first light emitting surface 112, a bottom surface 114 opposite to the first light emitting surface 112, a first light incident surface 116 connecting with the bottom surface 114 and the first light emitting surface 112, and at least one optical microstructure unit (not shown in FIGS. 1-3). The light-collecting structure 130 of this exemplary embodiment includes a second light emitting surface 132 connecting with the first light incident surface 116, a second light incident surface 134, a first reflective surface 136 connecting with the second light emitting surface 132 and the second light incident surface 134, and a second reflective surface 138 opposite to the first reflective surface 136 and connecting with the second light emitting surface 132 and the second light incident surface 134. In this exemplary embodiment, an air gap may exist between the second light emitting surface 132 and the first light incident surface 116.

Figure 4:
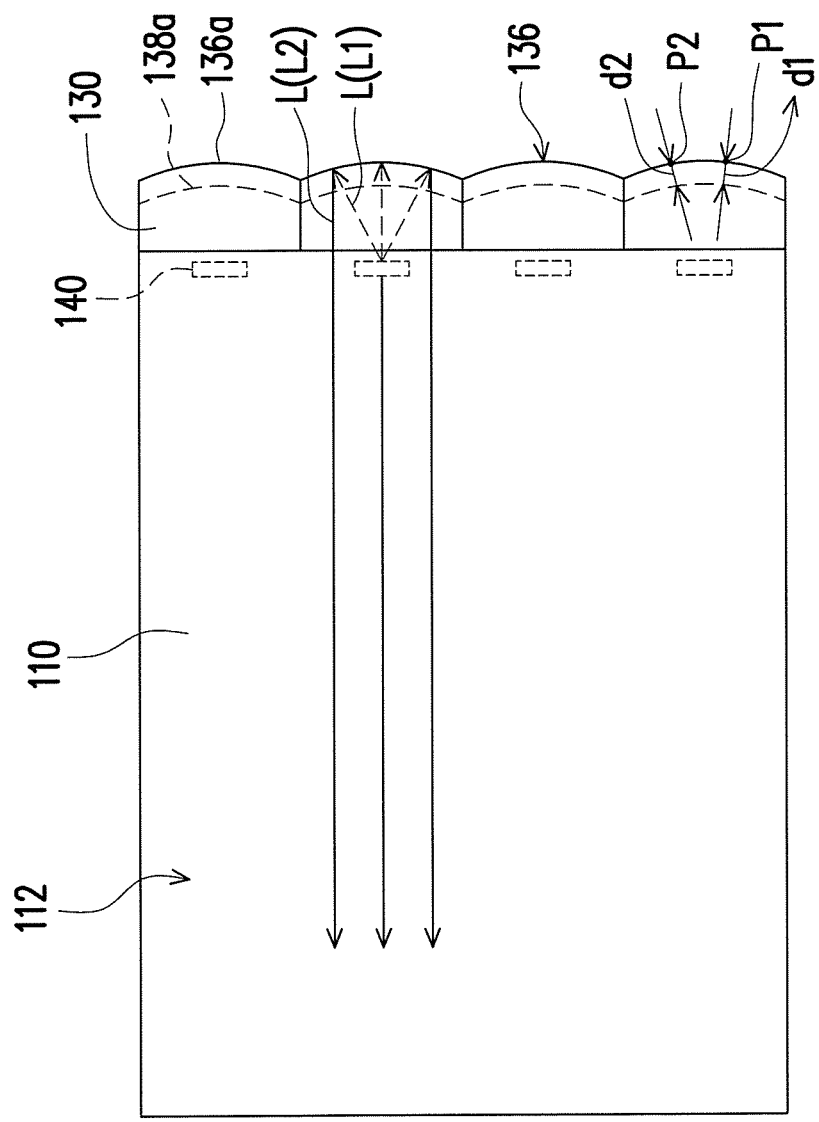
FIG. 4 is a top perspective view of the light source module in FIG. 2.

FIG. 4 is a top perspective view of the light source module in FIG. 2. Referring to FIGS. 2 and 4, the sectional line obtained by the sectioning of the first reflective surface 136 along the first reference plane S (denoted in FIG. 2) is a parabolic curve 136a (denoted in FIG. 4), wherein the first reference plane S (for example, the plane parallel to the xy plane) is parallel to the first light emitting surface 112. From another point of view, as shown in FIG. 1, the sectional line obtained by the sectioning of the first reflective surface 136 along the second reference plane (the paper surface or the plane parallel to the xz plane as shown in FIG. 1) includes a curve 136b with the recess substantially facing the light emitting device 140, wherein the second reference plane is vertical to the first light emitting surface 112. Further, referring to FIGS. 2 and 4, in this exemplary embodiment, the sectional line obtained by the sectioning of the second reflective surface 138 along the first reference plane S (denoted in FIG. 2) includes a second parabolic curve 138a (denoted in FIG. 4). In more detail, as shown in FIG. 4, the shortest distances d1, d2 from any two points P1, P2 of the first parabolic curve 136a to the second parabolic curve 138a are substantially the same. Alternatively, the thickness of the light-collecting structure 130 is substantially equal according to this exemplary embodiment. However, it should be understood that the current embodiments are presented by way of example and not by way of limitation and the thickness of the light-collecting structure 130 may vary in other exemplary embodiments.

Referring to FIGS. 1 and 4 concurrently, the light emitting device 140 of this exemplary embodiment is positioned at a side of the second light incident surface 134 and is appropriate for emitting light beams L. The light beams L sequentially pass the second light incident surface 134, the first reflective surface 136, the second light emitting surface 132, and the first light incident surface 116 to enter into the light guide plate 110. In the exemplary embodiment, the light emitting device 140 may be a light emitting diode (LED) or other appropriate light sources.

It is worthy to note that in this exemplary embodiment, as shown in FIG. 4, the light emitting device 140 may position on the focal plane of the first parabolic curve 136a. The degree of beams divergence of the light beams L1 emitted by light emitting device 140 is greater in the y direction. However, the degree of beams divergence of the light beams L2 in the y direction resulted from the reflection of the light beams L1 by the first reflective surface 136 is apparently reduced. Alternatively, the brightness distribution in the y direction of the first light emitting surface 112 of the light source module 100 of this exemplary embodiment focuses towards the normal viewing direction (the normal direction of the first light emitting surface 112) via the first reflective surface 136 of the light-collecting structure 130. In other words, the light-collecting structure 130 is applicable in confining the viewing angle in the y direction of the light source module 100. Further, a high reflective material may be optionally coated on the first parabolic curve 136a to enhance the light usage efficiency of the light source module.

Figure 5:
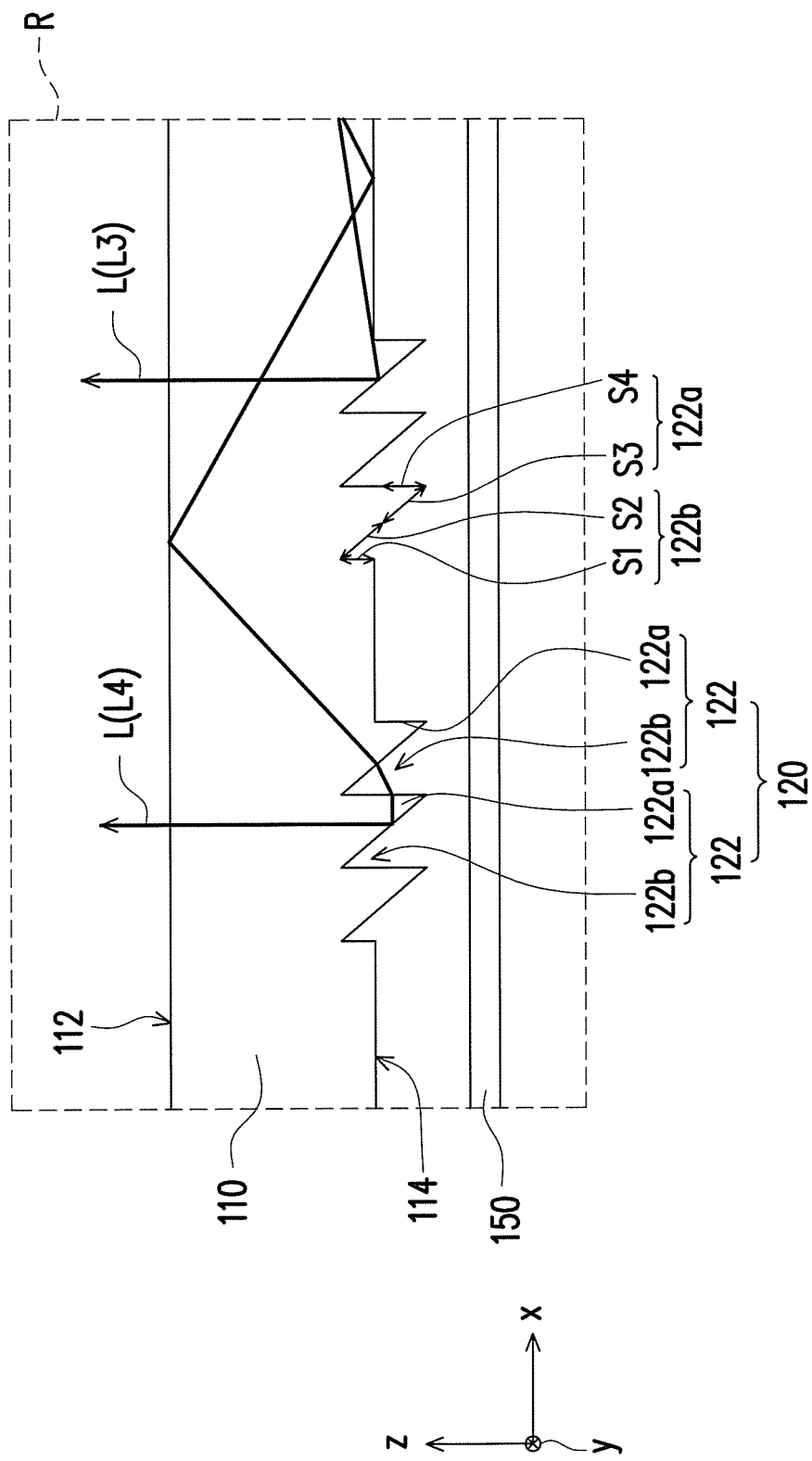
FIG. 5 is a local enlarged view of a region R of FIG. 1.

FIG. 5 is a local enlarged view of a region R of FIG. 1. Referring to FIG. 5, each first optical microstructure unit 120 includes at least two first optical microstructures 122. Each first optical microstructure 122 includes a recess portion 122b on the bottom surface 114 and a protrusion portion 122a on the bottom surface 114. The protrusion portion 122a and the recess portion 122b are connected together. Alternatively, the recess portion 122b has a first micro-surface S1 and a second micro-surface S2 connecting with the first micro-surface S1. The protrusion portion 122a has a third micro-surface S3 and a fourth micro-surface S4 connecting with the third micro-surface S3. The second micro-surface S2 and the third micro-surface S3 are connected together. As shown in FIGS. 1 and 5, in this exemplary embodiment, the first micro-surface S1 and the fourth micro-surface S4 are substantially perpendicular to the first light emitting surface 112. The second micro-surface S2 and the third micro-surface S3 are inclined relative to the first light incident surface 116. In more detail, the second micro-surface S2 and the third micro-surface S3 are directly connected and are substantially coplanar.

Still referring to FIGS. 1 and 5, after the light beams L enter the light guide plate 110 from the first light incident surface 116, the light beams L are guided by the optical microstructure unit 120 (illustrated in FIG. 5) to the first light emitting surface 112 and exit from the first light emitting surface 112. It is worthy to note that the optical microstructure unit 120 allows the light beams to focus towards the optical normal viewing direction (which is the normal line direction of the first light emitting surface 112) in the x direction. In other words, as shown in FIG. 5, a portion of the light beams L3 may be reflected by one of the first optical microstructures 122 of the optical microstructure unit 120 to the first light emitting surface 112. Since the second micro-surface S2 and the third micro-surface S3 of the first optical microstructure 122 are inclined relative to the first light emitting surface 112, the light beams L3, after being reflected by the second micro-surface S2 and the third micro-surface S3, are focused towards the normal viewing direction in the x direction. On the other hand, a portion of the light beams L4 may be refracted by one of the first optical microstructures 122 of the optical microstructure unit 120 to another one of the first optical microstructures 122. Through the second micro-surface S2 and the third micro-surface S3 of the first optical microstructures 122 and further being reflected to the first light emitting surface 112, the light beams L4 may also focus towards the normal viewing direction in the x direction.

Moreover, as shown in FIGS. 1 and 5, the optical module 100 of this exemplary embodiment may further include a reflection sheet 150. The reflection sheet 150 is configured at the bottom of the light guide plate 110. When the light beams L leave the light guide plate 110 from the bottom surface 114 or the optical microstructure unit 120, the reflection sheet 150 may reflect the light beams L back into the light guide plate 110. The light usage efficiency of the light source module 100 is thereby enhanced.

Figure 6:
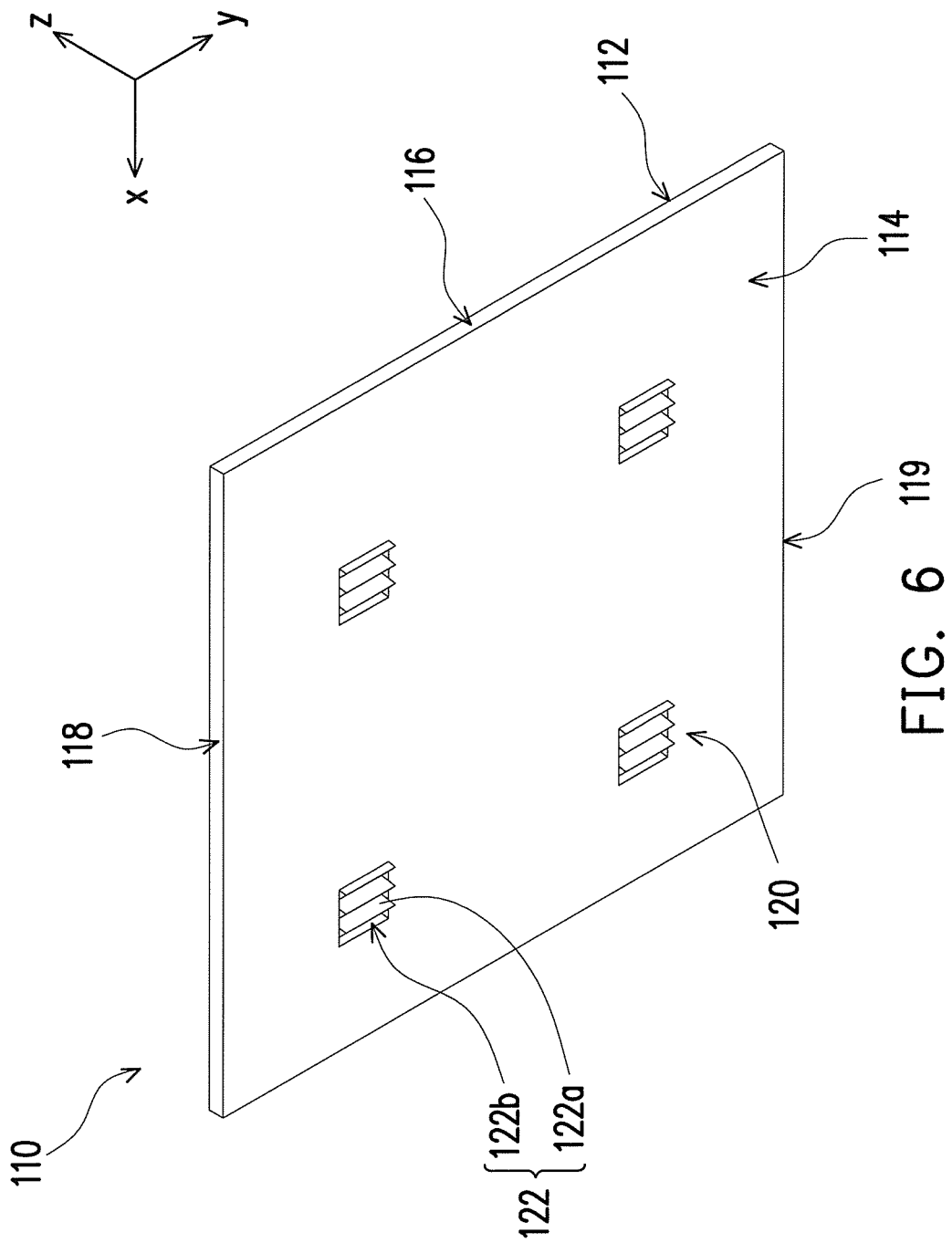
FIG. 6 illustrates the light guide plate and the optical microstructure unit in FIG. 5.

FIG. 6 illustrates the light guide plate and the optical microstructure unit in FIG. 5. Referring to FIG. 6, in this exemplary embodiment, the protrusion portion 122a of the first optical microstructures 122 has a shape of a triangular prism, and the extension direction of the protrusion portion 122a, is substantially parallel to the first light incident surface 116. The extension direction of the recess portion 112b is also parallel to the first light incident surface 116. Considering the brightness uniformity emitted from the light source module 100, the density of the optical microstructure unit 120 at the bottom surface 114 of the optical microstructure unit 120 increases as the distance of the optical microstructure unit 120 from the first light incident surface 116 increases in this exemplary embodiment. The light guide plate 110 of this exemplary embodiment further includes a first side surface 118 connecting with the first light emitting surface 112 and the bottom surface 114 and directly connecting with the first light incident surface 116, and a second side surface 119 opposite to the first side surface 118 and connecting the first light emitting surface 112 and the bottom surface 114. The density of the optical microstructure units 120 at the bottom surface 114 may increase from the center of the light guide plate 110 to the first side surface 118 and to the second side surface 119.

Figure 7:
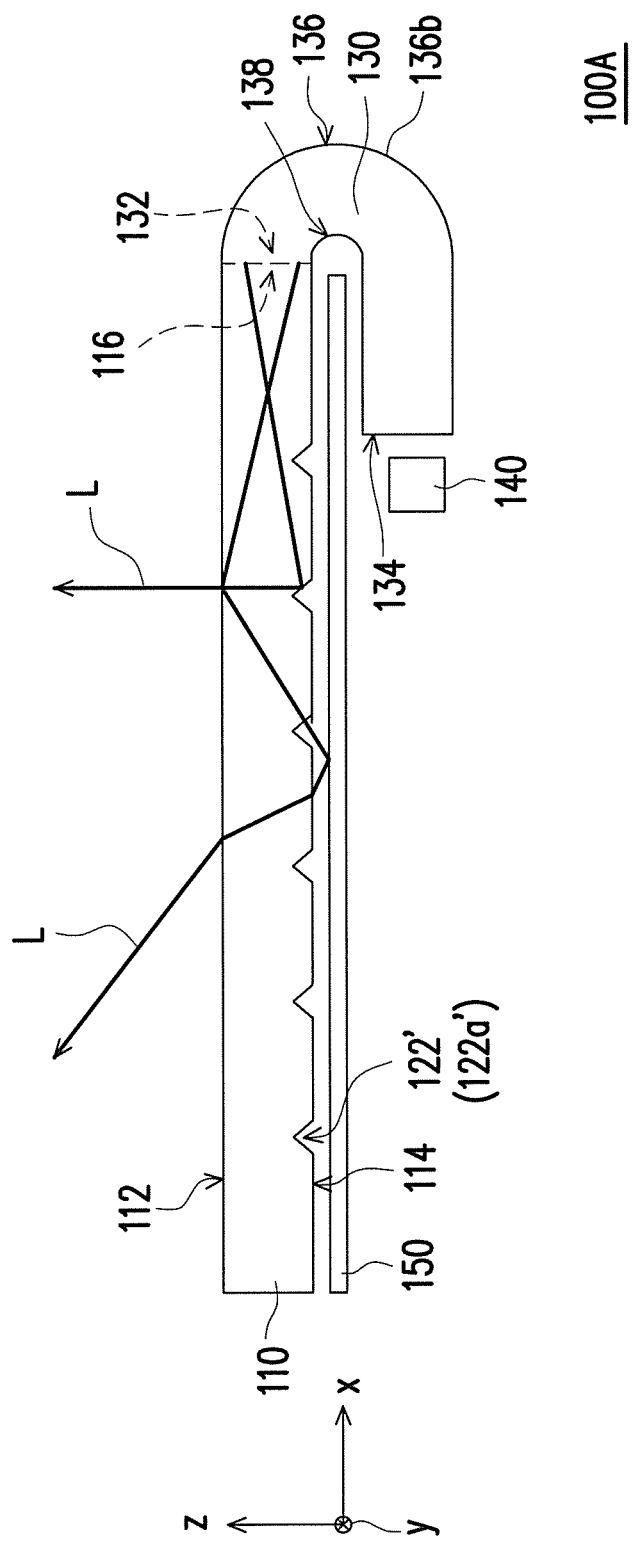
FIG. 7 is a schematic cross sectional view of a light source module of a comparative example.
Figure 8:
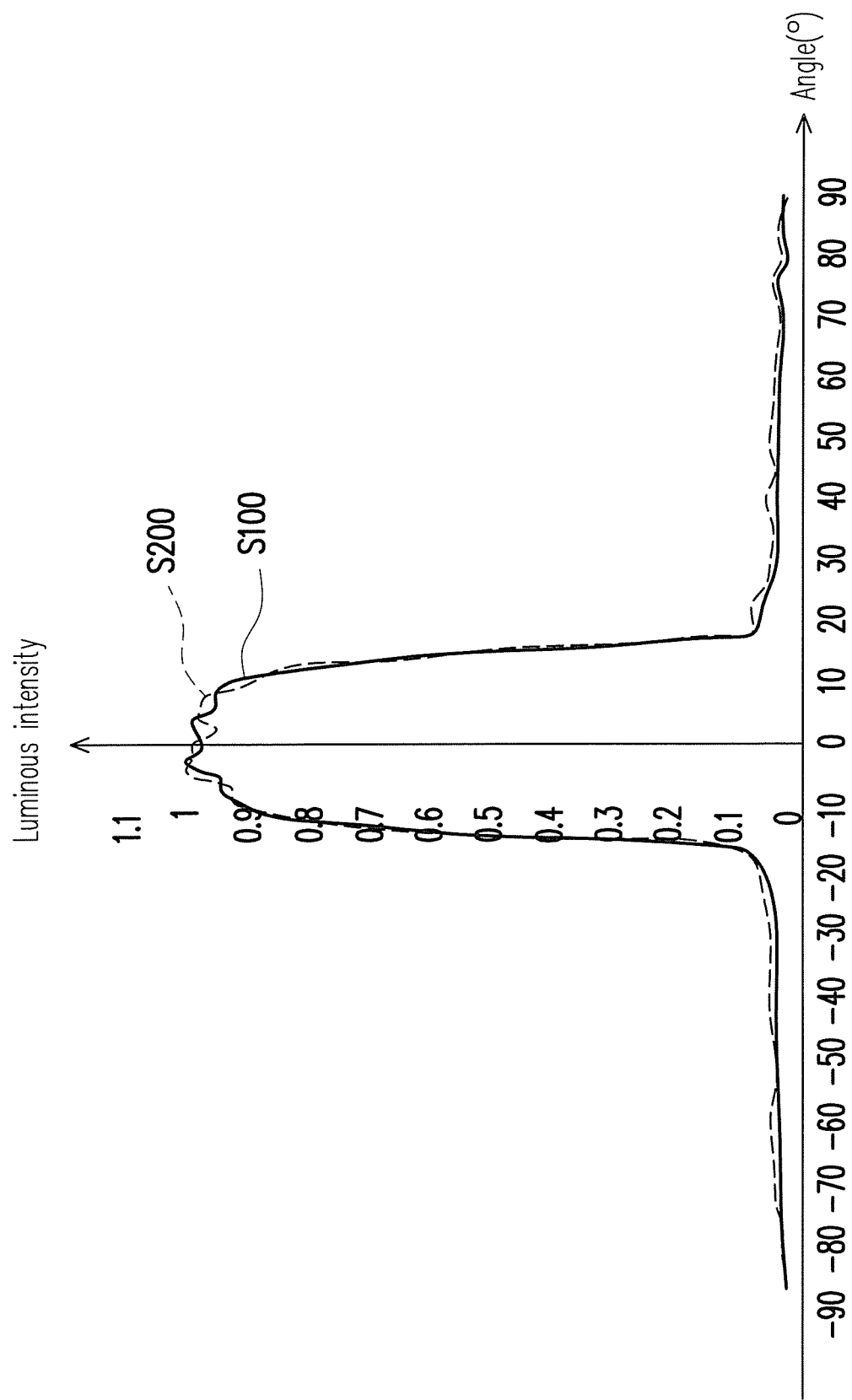
FIG. 8 illustrates the brightness distribution in the y direction of the light source module of the comparative example and of the light source module of an exemplary embodiment of the invention.

FIG. 7 is a schematic cross sectional view of a light source module of a comparative example. Referring to FIG. 7, the light source module 100A of the comparative example is similar to the light source module 100 of this exemplary embodiment. The difference between the two light source modules lies in the structure of the optical microstructure unit. The optical microstructure unit of the comparative example includes first optical microstructures 122'. Each first optical microstructure 122' includes a recess portion 122a' corresponding to the recesses at the bottom surface 114 and does include a protrusion portion. FIG. 8 illustrates the brightness distribution in the y direction of the light source module of the comparative example and the light source module of the present exemplary embodiment. Referring to FIG. 8, S100 represents the brightness distribution curve in the y direction of the light source module 100 of this exemplary embodiment, while S200 represents the brightness distribution curve in the y direction of the light source module 100A of the comparative example. Since the light source module 100A of the comparative example and the light source module 100 of this exemplary embodiment both have the a sectional line, including a parabolic curve, of the first reflective surface 136, the brightness distributions in the y direction of the light source module 100A of the comparative example and the light source module 100 of this exemplary embodiment both focus towards the normal viewing direction.

Figure 9:
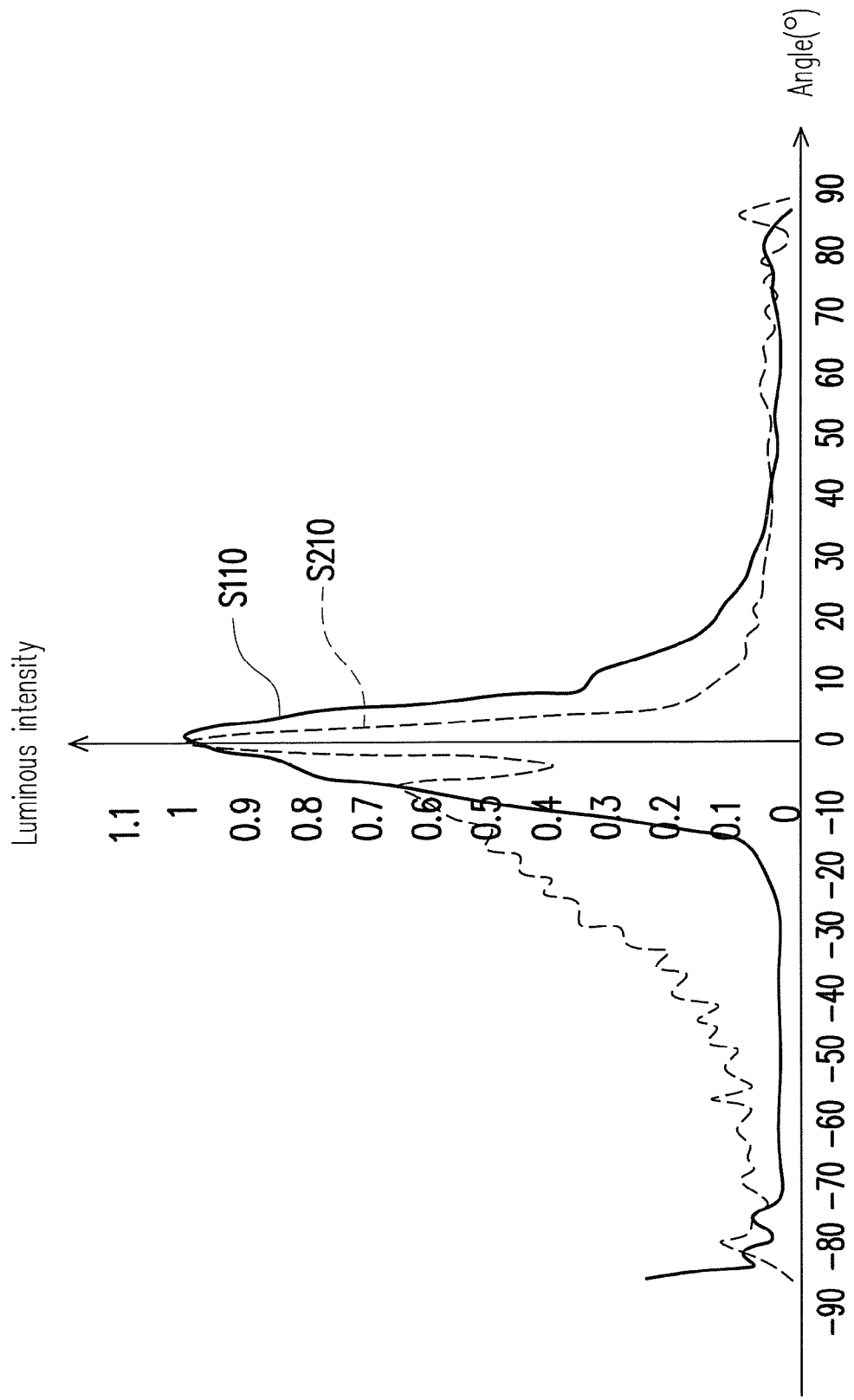
FIG. 9 illustrates the brightness distribution in the x direction of the light source module of the comparative example and the light source module of an exemplary embodiment of the invention.

FIG. 9 illustrates the brightness distribution in the x direction of the light source module of the comparative example and the light source module of the present exemplary embodiment. Referring to FIG. 9, S110 represents the brightness distribution curve in the x direction of the light source module 100 of this exemplary embodiment, while S210 represents the brightness distribution curve in the x direction of the light source module 100A of the comparative example. Referring to FIG. 7, the optical microstructures 122' of the first comparative example do not include a protrusion portion. When a portion of the light beams L pass through the recess portion 122a' and are reflected back to the light guide plate 110 by the reflection sheet 150, the light beams L exit the light guide plate 110 with a larger light exiting angle in the x direction. Referring to FIGS. 5 and 9, the light source module 100 of this exemplary embodiment utilizes an optical microstructure unit 120 including at least two first optical microstructures 122 in which the light beams L that pass through one of the first optical microstructures 122 are guided to another first optical microstructures 122 to reduce the light exiting angle of the light beams L when leaving the light guide plate 100. Accordingly, as shown in FIG. 9, the brightness distribution in the x direction S110 of the light source module 100 is more focused in the normal viewing direction than the brightness distribution in the x direction S210 of the light source module 100A of the comparative example.

Second Exemplary Embodiment

Figure 10:
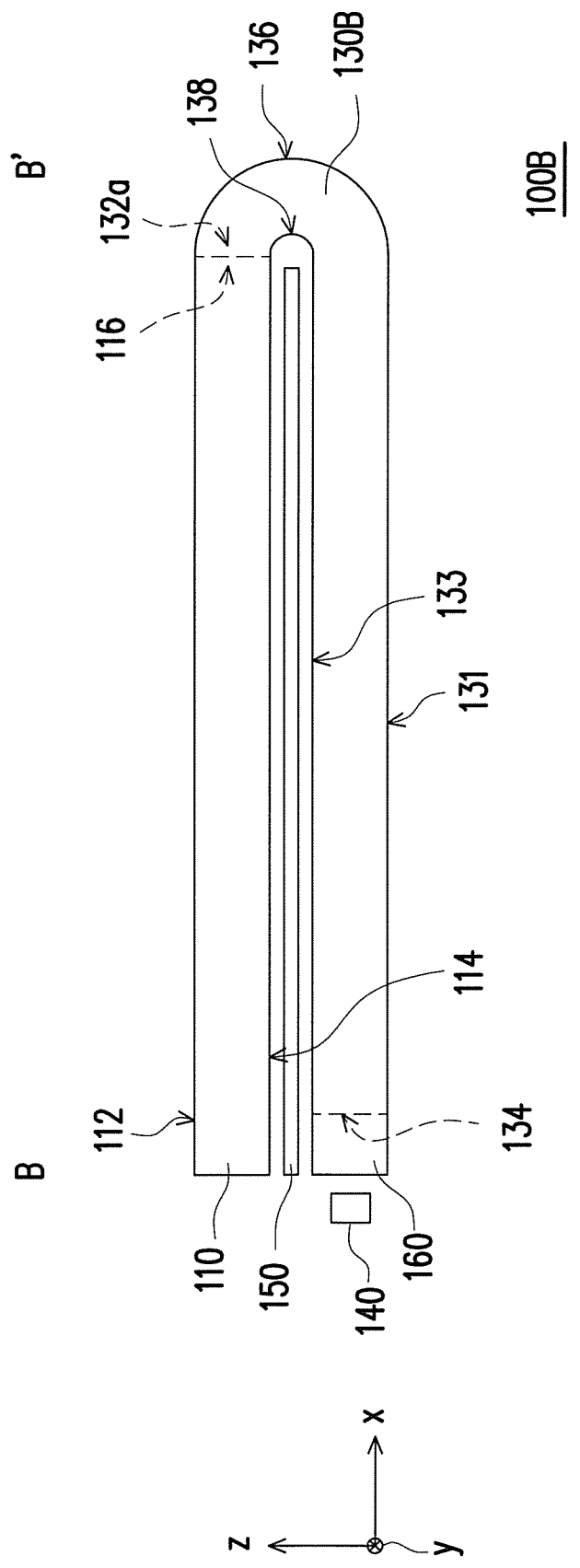
FIG. 10 is a schematic cross sectional view of a light source module according to a second exemplary embodiment of the invention.
Figure 11:
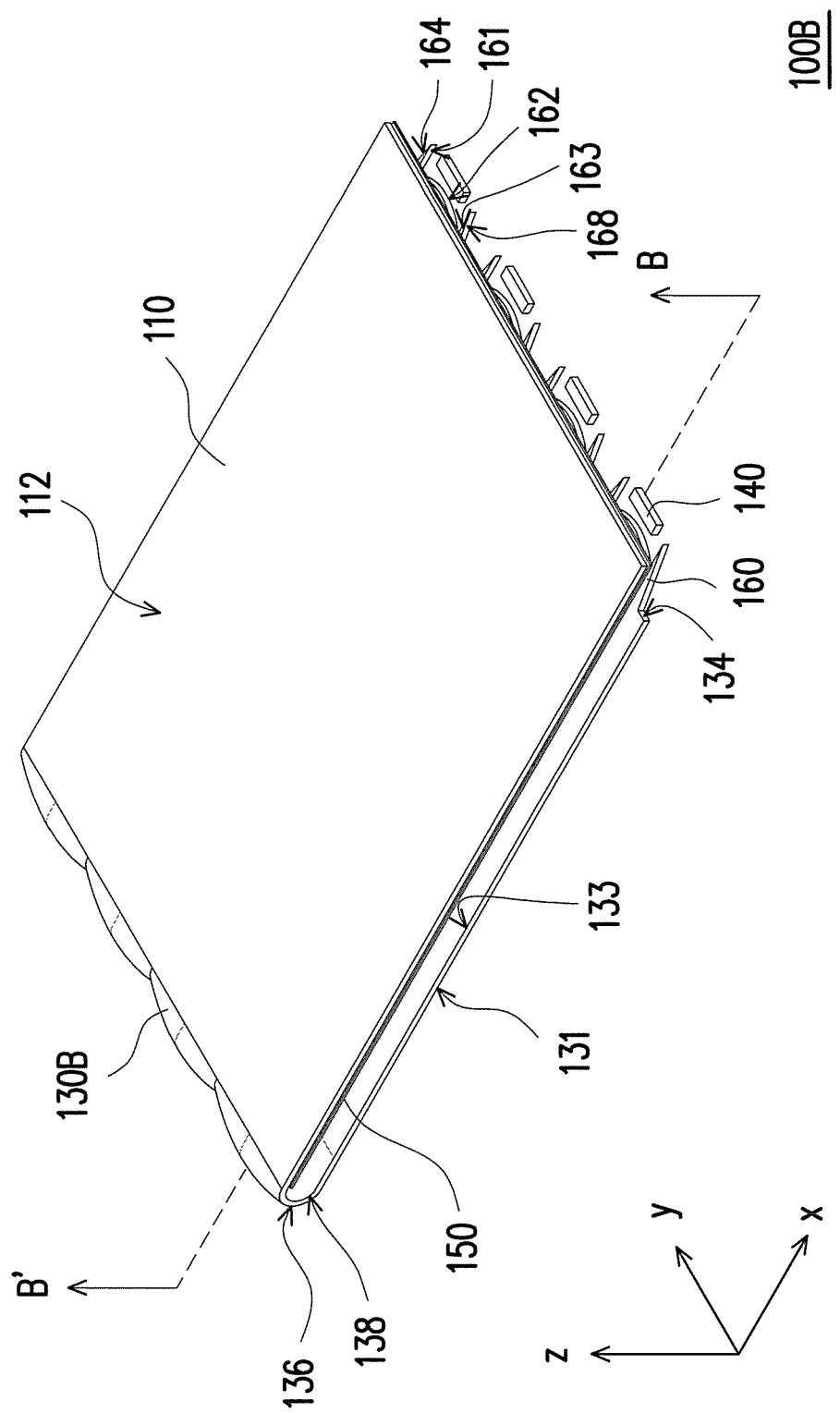
FIG. 11 is an isometric view of the light source module in FIG. 10.
Figure 12:
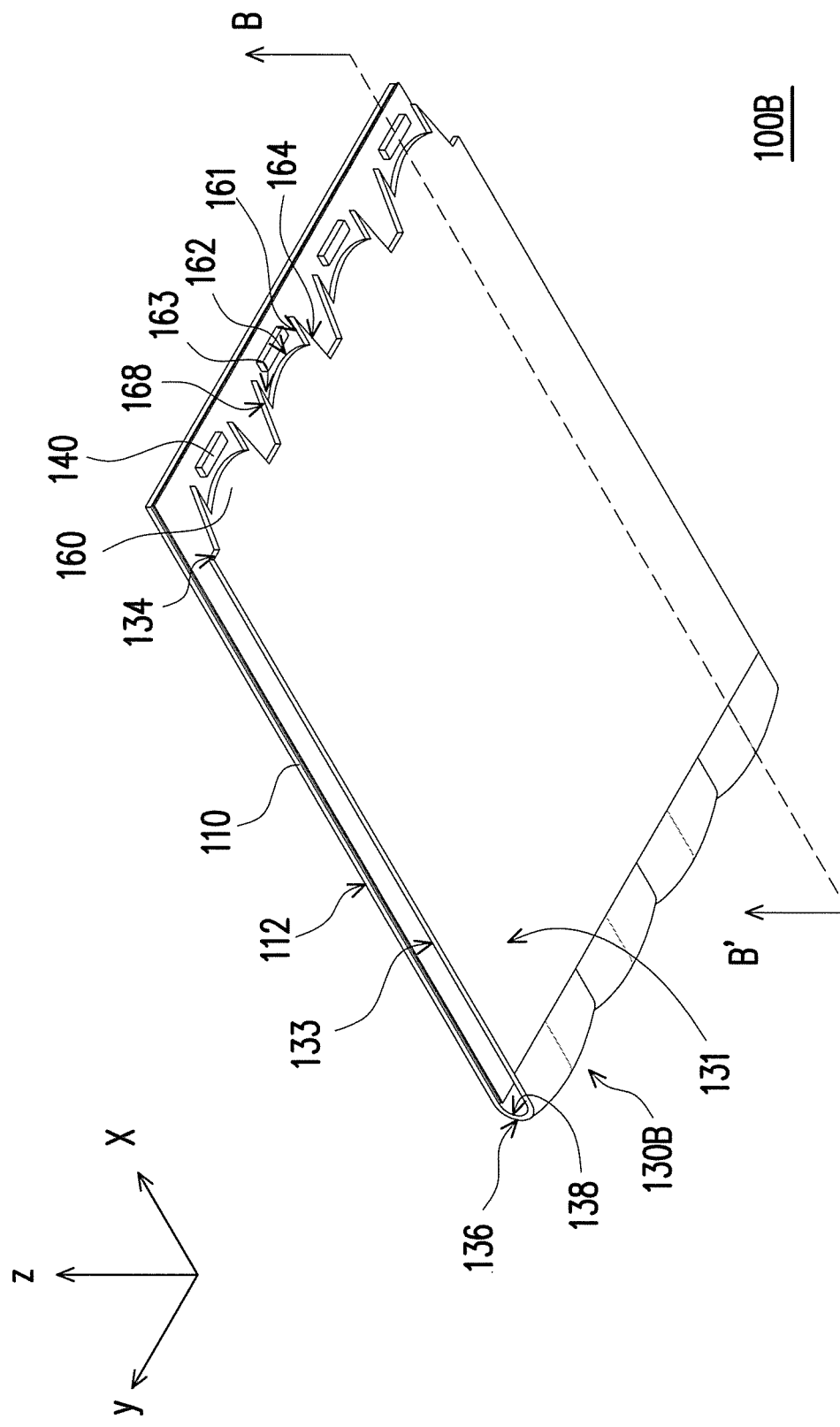
FIG. 12 is an isometric view of the light source module in FIG. 10.

FIG. 10 is a schematic cross sectional view of a light source module according to a second exemplary embodiment of the invention. FIG. 11 is an isometric view of the light source module in FIG. 10. FIG. 12 is an isometric view of the light source module in FIG. 10. FIG. 10 is a schematic cross sectional view of FIGS. 11 and 12 along the sectional line BB'. Referring to FIGS. 10, 11 and 12, the light source module 100B of this exemplary embodiment and the light source module 100 of the first exemplary embodiment 100 are similar; hence, the same reference numbers are used to refer to the same or like parts. The main difference between the light source module 100B of this exemplary embodiment and the light source module 100 of the first exemplary embodiment lies in the light-collecting structure 130B of this exemplary embodiment being different from the light-collecting structure 130 of the first exemplary embodiment. Further, the light source module 100B of this exemplary embodiment further includes a second optical microstructure 160 configured between the second light incident surface 134 and the light emitting device 140. The differences between the two light source modules are disclosed hereinafter; however, the similarities between the two light source modules are omitted.

Referring to FIGS. 10, 11 and 12, the light-collecting structure 130B further includes a first extension surface 131 and a second extension surface 133 corresponding to the first extension surface 131. The first extension surface 131 connects with the first reflective surface 136 and the second light incident surface 134. The second extension surface 133 connects with the second reflective surface 138 and the second light incident surface 134. In this exemplary embodiment, the first extension surface 131 and the second extension surface 133 are substantially parallel to the bottom surface 114. The first extension surface 131 and the second extension surface 133 may cover the entire bottom surface 114.

Referring to FIG. 10, the light source module 100B of this exemplary embodiment may further include a second optical microstructure 160 configured between the second light incident surface 134 and the light emitting device 140. In this exemplary embodiment, the second optical microstructure 160 is connected with the second light incident surface 134. It should be understood that this exemplary embodiment is presented by way of example and not by way of limitation. In other exemplary embodiments, an air gap may be present between the second optical microstructure 160 and the second light incident surface 134. Referring to FIGS. 11 and 12, the second optical microstructure 160 includes an arc surface 162, a first slanted surface 164 and a second slanted surface 168 respectively configured at two opposite sides of the arc surface 162 and connected with the arc surface 162. Further, the inclined direction of the first slanted surface 164 is opposite to the inclined direction of the second slanted surface 168. The second optical microstructure 160 further includes a first connection surface 161 and a second connection surface 163 respectively configured at two corresponding sides of the arc surface 162 and extend towards the extension of the light emitting device 140. The first connection surface 161 is connected with the first slanted surface 164 and the arc surface 162. The second connection surface 163 is connected with the second slanted surface 168 and the arc surface 162. In this exemplary embodiment, the first connection surface 161 and the second connection surface 163 may be vertical to the second light incident surface 134.

Figure 13:
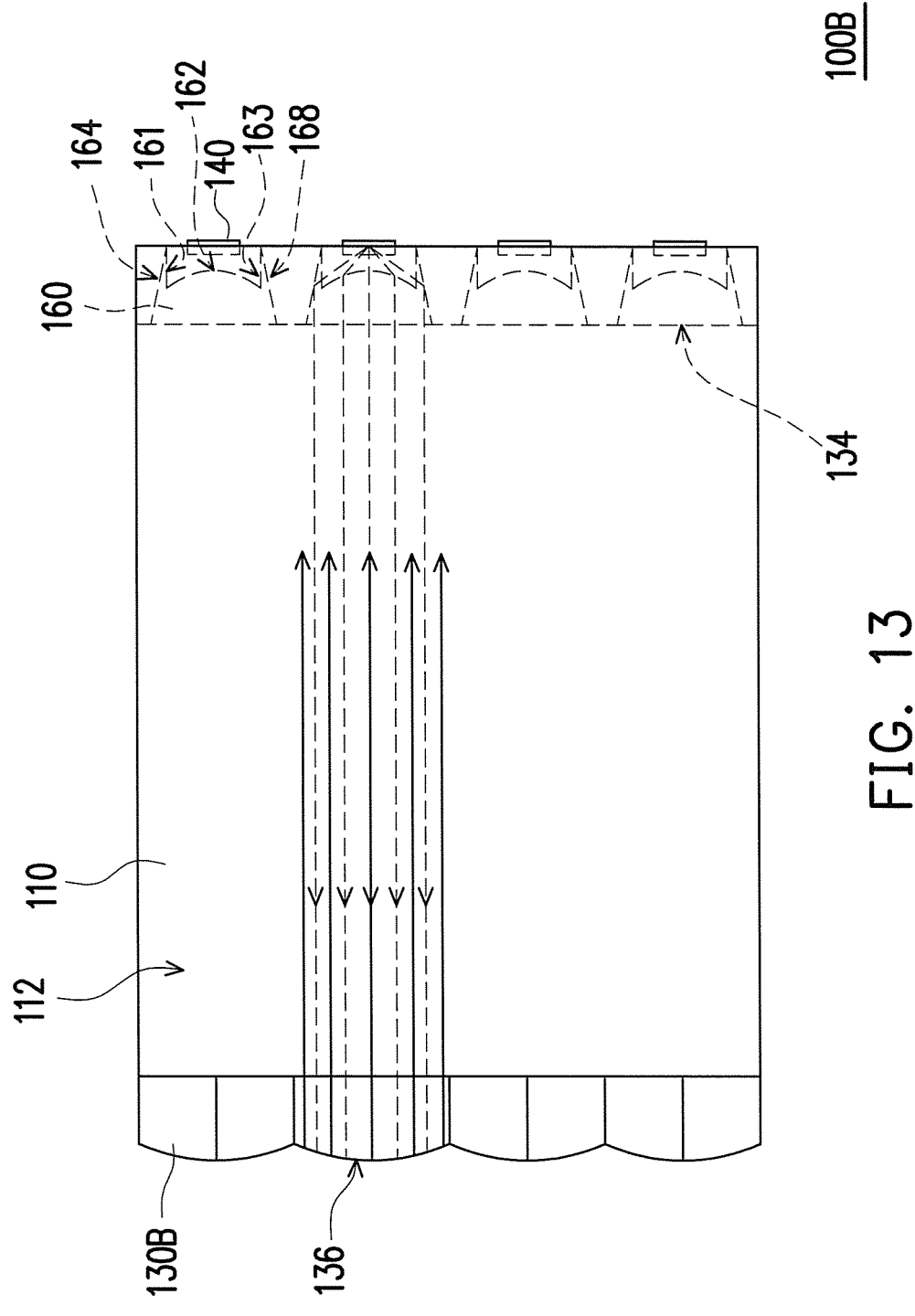
FIG. 13 is a top perspective view of the light source module in FIG. 11.

FIG. 13 is a top perspective view of the light source module in FIG. 11. Referring to FIG. 13, the second optical microstructure 160 of this exemplary embodiment allows the light beams L to focus in the y direction towards the normal viewing direction prior to entering into the light-collecting structure 130B. More particularly, after the light beams pass through the arc surface 162, the divergence angle of the light beams in the y direction is apparently reduced. Light beams with a larger divergence angle pass through the first connection surface 161 (or the second connection surface 163) are reflected by the first slanted surface 164 (or the second slanted surface 168). The light beams with a larger divergence angle may penetrate through the second light incident surface 134 at a smaller incident angle by the adjustment of the first slanted surface 164 (or the second slanted surface 168). Alternatively, in this exemplary embodiment, the light beams may penetrate through the second optical microstructure 160 and focus in the y direction towards the normal viewing direction. The light beams are further focused in the y direction towards the normal viewing direction through the light-collecting structure 130B.

In addition, the light source module 100B of this exemplary embodiment also provides similar effects and benefits of those of the light source module 100 of the first exemplary embodiment, the details thereof are thereby omitted.

According to the above disclosure, the light source module of the exemplary embodiment, through the sectional line that includes the parabolic light-collecting structure, is adapted to provide the brightness distribution in the vertical direction (which is the y direction) to focus towards the normal viewing direction. Moreover, through the first optical microstructure unit, the brightness distribution in the horizontal direction (which is the x direction) of the light source module of the exemplary embodiment focuses towards the normal viewing direction. Alternatively, the light source module of the exemplary embodiment of the invention allows the brightness distribution in both the horizontal direction and the vertical direction to focus towards the normal viewing direction to enhance the brightness of the regular direction in absent of any additional optical film.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, comprising:
a light guide plate comprising a first light emitting surface, a bottom surface opposite to the first light emitting surface, a first light incident surface connecting with the bottom surface and the first light emitting surface, and at least one optical microstructure unit, the optical microstructure unit comprising:
at least two first optical microstructures, each of the least two first optical microstructures comprising a recess portion on the bottom surface and a protrusion portion on the bottom surface, and the protrusion portion connecting with the recess portion, wherein the protrusion portion is located between the first light incident surface and the recess portion, the recess portion comprises a first micro-surface and a second micro-surface connecting with the first micro-surface, and the protrusion portion comprises a third micro-surface and a fourth micro-surface connecting with the third micro-surface, wherein the second micro-surface and the third micro-surface are connected, an extension direction of the first micro-surface and the fourth micro-surface are substantially perpendicular to the first light emitting surface, and an extension direction of the second micro-surface and the third micro-surface are inclined relative to the first light incident surface;
at least one light-collecting structure, comprising a second light emitting surface connecting with the first light incident surface, a second light incident surface, a first reflective surface connecting with the second light emitting surface and the second light incident surface, and a second reflective surface opposite to the first reflective surface and connecting with the second light emitting surface and the second light incident surface, wherein a section of the first reflective surface obtained by a first reference plane comprises a sectional line, and the sectional line comprises a first parabola, wherein the first reference plane is parallel to the first light emitting surface; and at least one light emitting device adapted to emit light beams, the light beams sequentially passing through the second light incident surface, the first reflective surface, the second light emitting surface, the first light incident surface to enter into the light guide plate, the light beams entering the light guide plate guiding by the optical microstructure unit to the first light emitting surface.

2. The light source module of claim 1, wherein the second micro-surface and the third micro-surface are directly connected and are substantially coplanar.

3. The light source module of claim 1, wherein a portion of the light beams are reflected by one of the first optical microstructures of the optical microstructure unit to the first light emitting surface.

4. The light source module of claim 1, wherein a portion of the light beams are refracted by one of the first optical microstructures of the optical microstructure unit to another one of the first optical microstructures of the optical microstructure unit, and the portion of the light beams transmitted to the another one of the first optical microstructures of the optical microstructure unit is reflected by the another one of the first optical microstructures to the first light emitting surface.

5. The light source module of claim 1, wherein the light guide plate further comprises a plurality of the microstructure units, and a density of the plurality of the microstructure units increases as a distance of the optical microstructure units from the first light incident surface increases.

6. The light source module of claim 1 further comprising a plurality of the optical microstructure units, and the light guide plate further comprising a first side surface connecting with the first light emitting surface and the bottom surface and directly connecting with the first light incident surface, and a second side surface opposite to the first side surface and connecting with the first light emitting surface and the bottom surface, wherein a density of the plurality of the optical microstructure units increases from a center of the light guide plate to the first side surface and to the second side surface.

7. The light source module of claim 1, wherein a section of the first reflective surface obtained by a second reference plane comprises a sectional line and the sectional line comprises a curve substantially curved towards the light emitting device, wherein the second reference plane is vertical to the first light emitting surface.

8. The light source module of claim 1, wherein the section of the second reflective surface obtained by the first reference plane comprises a sectional line comprising a second parabola.

9. The light source module of claim 8, wherein shortest distances from any point on the first parabola to any point on the second parabola are substantially the same.

10. The light source module of claim 1, wherein the light emitting device is substantially disposed on a focal plane of the first parabola.

11. The light source module of claim 1, wherein the light-collecting structure further comprises a first extension surface and a second extension surface opposite to the first extension surface, and the first extension surface is connected with the first reflective surface and the second light incident surface, and the second extension surface is connected with the second reflective surface and the second light incident surface.

12. The light source module of claim 11, wherein the first extension surface and the second extension surface are substantially parallel to the bottom surface.

13. The light source module of claim 11, wherein the first extension surface and the second extension surface covers the entire bottom surface.

14. The light source module of claim 1 further comprising at least a second optical microstructure configured on a transmission path of the light beams and between the second light incident surface and the light emitting device.

15. The light source module of claim 14, wherein the second optical microstructure comprises an arc surface, a first slanted surface and a second slanted surface respectively at two opposite sides of the arc surface and connecting with the arc surface, and the first slanted surface and the second slanted surface are inclined with respect to the second light incident surface, and an inclined direction of the first slanted surface is opposite to an inclined direction of the second slanted surface.

16. The light source module of claim 15, wherein the second optical microstructure further comprises a first connection surface and a second connection surface configured at two opposite sides of the arc surface and extending towards the light emitting device, and the first connection surface is connected with the first slanted surface and the arc surface, and the second connection surface is connected with the second slanted surface and the arc surface.

17. The light source module of claim 1 further comprising a reflection sheet, configured between the bottom surface of the light guide plate and the light-collecting structure.

* * * * *